(12) United States Patent
Straßer

(10) Patent No.: US 12,348,165 B2
(45) Date of Patent: Jul. 1, 2025

(54) METHOD FOR CONTROL OF AN EXTERNALLY EXCITED ELECTRIC MACHINE OF A MOTOR VEHICLE, AND THE MOTOR VEHICLE

(71) Applicant: AUDI AG, Ingolstadt (DE)

(72) Inventor: Roman Straßer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 176 days.

(21) Appl. No.: 18/351,403

(22) Filed: Jul. 12, 2023

(65) Prior Publication Data
US 2024/0022195 A1 Jan. 18, 2024

(30) Foreign Application Priority Data
Jul. 13, 2022 (DE) .......................... 102022117402.6

(51) Int. Cl.
| | | |
|---|---|---|
| *H02P 23/14* | (2006.01) | |
| *B60L 3/04* | (2006.01) | |
| *B60L 50/60* | (2019.01) | |
| *H02P 29/024* | (2016.01) | |

(52) U.S. Cl.
CPC ............... *H02P 23/14* (2013.01); *B60L 3/04* (2013.01); *B60L 50/60* (2019.02); *H02P 29/024* (2013.01); *B60L 2210/14* (2013.01); *B60L 2240/421* (2013.01); *B60L 2240/429* (2013.01)

(58) Field of Classification Search
CPC .......... H02P 23/14; H02P 29/024; H02P 9/48; H02P 9/12; H02P 6/00; H02P 29/64; B60L 3/04; B60L 50/60; B60L 2210/14; B60L 2240/421; B60L 2240/429; B60L 2220/10; B60L 2240/425; B60L 2240/427; B60L 15/20
USPC .................................................. 318/461, 445
See application file for complete search history.

(56) References Cited

U.S. PATENT DOCUMENTS 7,285,930 B2 * 10/2007 Weinmann .............. H02P 6/182
318/672
2013/0128394 A1 5/2013 Spannhake et al.

FOREIGN PATENT DOCUMENTS

| CN | 1581675 A | 2/2005 |
|---|---|---|
| DE | 9321313 U1 | 6/1997 |
| DE | 102010001626 A1 | 8/2011 |
| DE | 102016207392 A1 | 11/2017 |
| DE | 102017204091 A1 | 9/2018 |
| DE | 102021200814 A1 | 8/2022 |
| EP | 2684288 B1 | 4/2022 |
| WO | WO 2011086513 A1 | 7/2011 |

* cited by examiner

*Primary Examiner* — David Luo
(74) *Attorney, Agent, or Firm* — Seed IP Law Group LLP

(57) ABSTRACT

A method for control of an externally excited electric machine of a motor vehicle, wherein a current flow is generated and/or controlled in at least one exciter winding of the electric machine by way of a power module connected to the exciter winding, wherein a counter-voltage is generated by way of a de-excitation module, connected to the exciter winding and arranged separately from the power module and operated separately from the power module, which is applied to the exciter winding and at least partly compensates for the voltage currently being generated by way of the power module and applied to the exciter winding, so that a de-excitation of the exciter winding occurs.

14 Claims, 1 Drawing Sheet

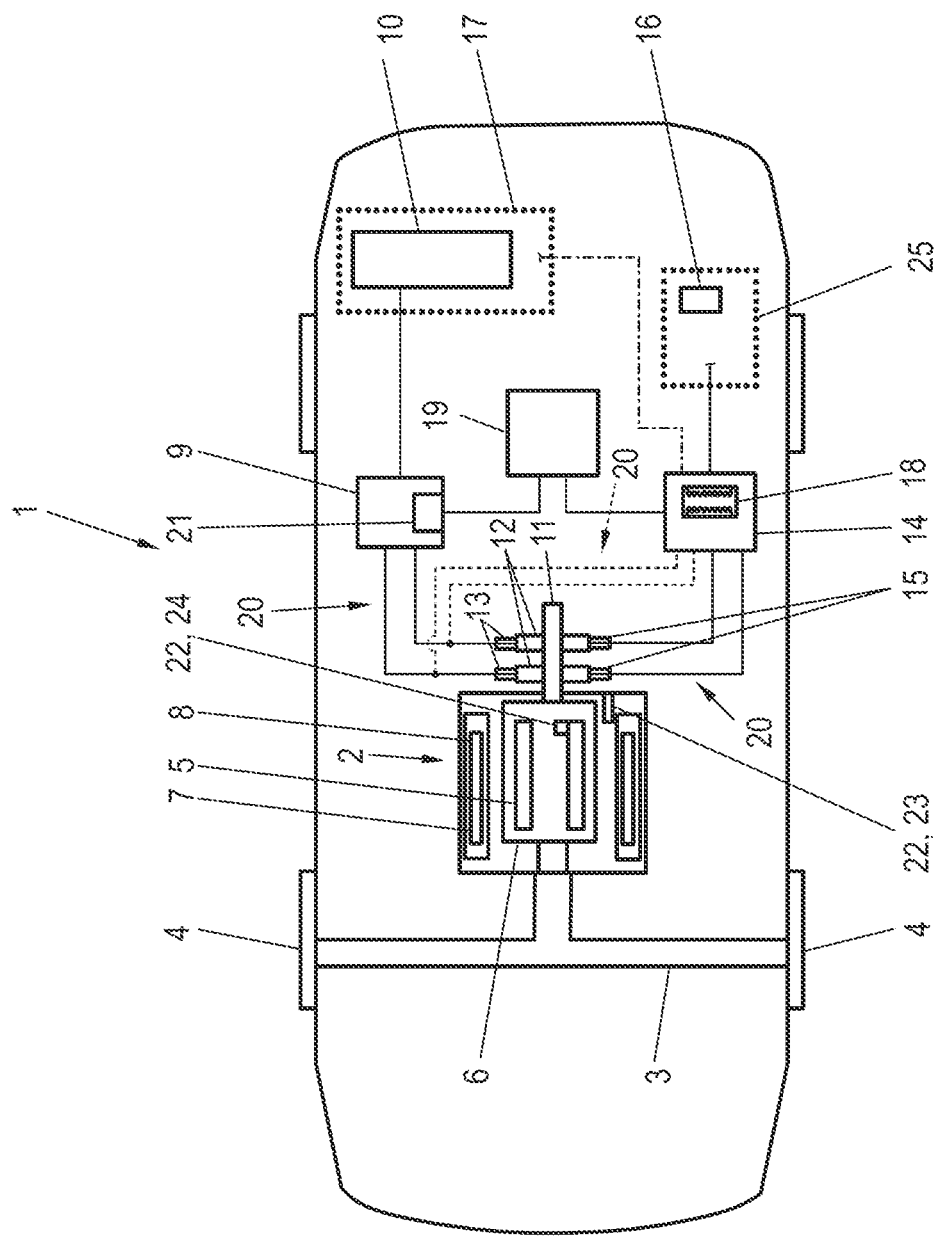

METHOD FOR CONTROL OF AN EXTERNALLY EXCITED ELECTRIC MACHINE OF A MOTOR VEHICLE, AND THE MOTOR VEHICLE

BACKGROUND

Technical Field

The present disclosure relates to a method for control of an externally excited electric machine of a motor vehicle, wherein a current flow is generated and/or controlled in at least one exciter winding of the electric machine by way of a power module connected to the exciter winding.

Description of the Related Art

Electric machines are being used increasingly as drive machines in motor vehicles. Permanently excited synchronous machines are used predominantly as the main drive unit. However, externally excited synchronous machines are also gaining in importance, since magnets are typically used for permanently excited synchronous machines that contain rare earth elements. Such materials are relatively costly, especially when large field strengths are required. Furthermore, only a few sources are available for such materials, so that in terms of cost efficiency it is becoming increasingly relevant to use externally excited instead of permanently excited synchronous machines.

In the case of externally excited synchronous machines, it is necessary for their operation to bring an exciter current into an exciter winding, especially a rotor. The exciter winding therefore serves for generating a magnetic exciter field, and it needs to be energized for this.

With externally excited electric machines, especially externally excited synchronous machines, large electric currents and voltages are induced in event of a fault, especially when a large magnetic field is being generated by way of the exciter winding. These can damage electrical components or semiconductor components. As a countermeasure, an active short circuit is often produced, for example, across a power module or a pulse inverter, but a very good short-circuit strength must be assured in order to prevent a disrupting of the components across which the short circuit travels. This short-circuit strength is typically realized by a larger power semiconductor surface, although this results in high costs. This is especially disadvantageous, also in particular since this cost-intensive measure is required solely in connection with active short-circuit currents, because such large currents or voltages generally do not occur in normal operation of the electric machine.

In order to deal with this, several proposals have already been made in the prior art. These are based in particular on producing a de-excitation of the exciter winding in event of a fault, so that the magnetic field generated by the exciter winding and hence the induced voltages and currents are reduced. It is known from WO 2011/086513 A1 how to reduce the electric energy stored in the exciter winding by way of an electrical consumer. DE 10 2010 001 626 A1 and DE 10 2017 204 091 A1 propose the generating of a counter-voltage for the de-excitation of the exciter winding.

BRIEF SUMMARY

Embodiments of the disclosure provide an improved, especially a reliable concept for the de-excitation of the exciter winding of an externally excited electric machine in event of a fault.

Embodiments of the disclosure provide a method of the kind mentioned above in that a counter-voltage is generated by way of a de-excitation module, connected to the exciter winding and arranged separately from the power module and operated separately from the power module, which is applied to the exciter winding and at least partly compensates for the voltage currently being generated by way of the power module and applied to the exciter winding, so that a de-excitation of the exciter winding occurs.

The externally excited electric machine, which is preferably an externally excited synchronous machine, is provided, for example, as a drive motor for the motor vehicle. The electric machine preferably comprises a rotor having at least one rotor winding functioning as the exciter winding, the rotor being mounted to turn in a housing of the electric machine. The electric machine further comprises a stator fixed inside the housing and having at least one stator winding, which interacts with the magnetic field generated on the side with the exciter winding in order to operate the electric machine.

Thus, the electric machine can be operated in a drive mode, during which electric energy stored in a traction battery of the motor vehicle is converted by way of the electric machine into kinetic energy and transmitted across a drive train to the wheels, in particular the front and/or rear wheels of the motor vehicle. In a generator mode of the electric machine, kinetic energy of the motor vehicle is converted by way of the electric machine into electric energy, which can be stored in the traction battery or used for other purposes. In this way, a decelerating or braking torque of the motor vehicle is achieved.

The generating of an alternating voltage is required for the operation of the electric machine. This typically occurs by way of the power module, which is hooked up between the electric machine and the traction battery of the motor vehicle. The power module is adapted to transform the electric DC voltage present on the side with the traction battery into an electric alternating voltage and vice versa. The power module can also be called a rectifier or inverter and it comprises circuits with corresponding semiconductor elements for the purpose of the voltage transformation.

In event of a fault in the electric machine, the magnetic field currently being generated by way of the exciter winding in combination with a high speed of rotation of the rotor of the electric machine means that a voltage is induced in the stator winding which is far greater than the voltage values intended for normal operation. These values may be so large that currents in the range of 1000 to 1500 Ampere, sometimes even 2000 Ampere, may occur during the aforementioned countermeasure of active short circuiting. On the contrary, current strengths of only around 30 Ampere occur in normal operation.

The present disclosure is based in part on the notion of carrying out a reliable de-excitation of the exciter winding, free of delay as much as possible, instead of the active short circuiting. That is, the electric energy stored in the exciter winding, on which the magnitude of the magnetic field currently being generated by way of the exciter winding depends, is reduced as much as possible without delay and in particular decreased to zero. This so-called de-excitation has the effect that the active short circuiting as a countermeasure is no longer absolutely necessary. Hence, the disadvantages which come with it, such as the corresponding design of the components involved in the active short circuit, are overcome, so that in particular material costs can be saved.

In order to realize the counter-voltage, the de-excitation module is provided. This comprises circuits required for this with corresponding semiconductor elements. According to the disclosure, the de-excitation module is arranged separately from the power module and can be operated separately from it. In particular, it is provided that the voltage generated by way of the power module and applied to the exciter winding and the counter-voltage generated by way of the de-excitation module and applied to the exciter winding are taken by separate conduction pathways to the exciter winding and to the rotor. The de-excitation module and the power module thus realize systems which are independent of each other and self-sufficient from each other. This has the benefit, in particular, that if the fault occurs on the side with the power module, the generating of the counter-voltage still occurs reliably.

In the method according to the disclosure, it is preferably provided that at least one item of fault information is registered by way of at least one fault detection device, especially one connected to the power module, describing a malfunction which is present in regard to the control and/or the operation of the electric machine, and the generating of the counter-voltage only occurs if the fault information is present. In fault-free operation of the electric machine, i.e., when no presence of a fault is currently detected by way of the fault detection device, the de-excitation module will preferably be in a "standby" state in which no counter-voltage is generated.

The fault information describes in particular an irregular operation of a software designed for the control of the electric machine and/or the power module. Thus, in such a case, a restarting of the software may be required, and during this time a proper control of the electric machine is not possible and it is necessary to generate the counter-voltage. The software is implemented, e.g., on a control unit, such as that of the motor vehicle or the power module.

Regarding the fault information, it is conceivable that this describes the loosening of a connection cable of the motor vehicle or the electric machine, by which signals and/or electric currents are transmitted to and/or from the electric machine or within the electric machine. The loosening of the connection cable may be caused by a loosening due to the travel motion and a subsequent detachment of a plug connection. The connection cable may be a ground wire, to which the exciter winding is connected in particular, or a cable for transmitting of measurement signals or a cable for transmitting of power supply currents or the like.

In one embodiment of the method according to the disclosure, it is provided that in addition at least one item of operating information regarding the operation of the electric machine is registered, and the generating of the counter-voltage is done in addition in dependence on the operating information. Thus, situations are conceivable in which the mere presence of the fault information in itself does not require the de-excitation of the exciter winding. Thus, the magnetic field currently being generated by way of the exciter winding depends on many operating states of the motor vehicle or the electric machine, and in many instances the magnetic field currently being generated is small enough so that no damaging of components due to a current induced in this way is possible. In this case, the de-excitation of the exciter winding is unnecessary. A sensor signal of at least one sensor of the motor vehicle or the electric machine, especially one on the part of the or a control device, can be evaluated for detection of the operating information.

Thus, the operating information can describe a current speed of rotation of a rotor of the electric machine. Basically, the current or voltage values induced by way of the magnetic field generated by way of the exciter winding are proportional to the speed of the rotor, and the de-excitation of the exciter winding is not required at a low rotor speed. The sensor for detecting the speed of rotation can be a rotor position transmitter, by which the current rotation position of the rotor can be detected.

The operating information can additionally or alternatively describe an electric current strength currently present in the exciter winding and/or an electric voltage currently applied to the exciter winding. Here as well, the magnetic field generated by the exciter winding will be smaller as the corresponding current strength or voltage is smaller. Control data of the control unit can be detected and evaluated for detection of the operating information.

The operating information can additionally or alternatively describe a current temperature of the exciter winding. The higher the temperature of the exciter winding, the larger is its ohmic resistance and the smaller is the magnetic field generated for a particular current strength or voltage. Thus, for a correspondingly high temperature of the exciter winding, the generated magnetic field may still be small enough, based on this temperature, that no de-excitation is required.

Regarding the operating information, it is furthermore conceivable that the amplitude of the generated counter-voltage will depend on this.

The generating of the counter-voltage can be done when induction information ascertained with the aid of the operating information and regarding the current strength induced in a stator winding indicates that the current strength currently induced in the stator winding, which is brought about by the current rotor speed and the magnetic field generated by the exciter winding, is larger than a current strength limit value, especially a given fixed value. Thus, with the aid of the operating information, the current speed of rotation and the magnitude of the magnetic field currently being generated by the exciter winding can be determined, and with the aid of these values an evaluable induced current strength in the stator winding can be determined. The de-excitation of the exciter winding can then be initiated if the anticipated current strength in the stator winding is larger than the current strength limit value for which a damaging of the semiconductor components of the units involved is to be expected when exceeded.

The evaluation of the operating information can be done with the aid of a lookup table, which is memorized in particular in the or in a control device. Thus, the look-up table can contain pairs of values regarding the rotor speed and the current strength actually present in the exciter winding or triplets of values regarding the rotor speed, the current strength actually present in the exciter winding, and the current temperature of the exciter winding, each pair of values or triplet of values being matched up with whether or not the counter-voltage should be generated at present.

In the method according to the disclosure it can be provided that the counter-voltage is generated by way of a voltage which is present in a high-voltage onboard network, in which a traction battery of the motor vehicle is incorporated, and/or by way of a voltage which is present in a low-voltage onboard network, in which a low-voltage battery of the motor vehicle is incorporated. Thus, on the one hand, a high-voltage battery, namely the traction battery, and on the other hand a low-voltage battery, which is incorporated in particular in a 12-Volt onboard network of the motor vehicle, can serve as a voltage source for generating the counter-voltage.

In one modification of this, it can be provided that a voltage regulating element is connected between the high-voltage onboard network and/or the low-voltage onboard network and the electric machine, and the amplitude of the generated counter-voltage is set by way of the voltage regulating element. The voltage regulating element can be a voltage transformer and/or a boost converter, i.e., a circuit with semiconductor components for modification of a voltage strength. The voltage regulating element can be a component of the de-excitation module.

The voltage currently generated by way of the power module and applied to the exciter winding is partly or completely compensated by way of the counter-voltage. Thus, a complete compensation of the voltage generated by way of the power module is not necessarily required, since basically a reducing of this voltage to a lower voltage level is sufficient to prevent damage.

The present disclosure moreover relates to a motor vehicle having an externally excited electric machine, wherein a current flow can be generated and/or controlled in at least one exciter winding of the electric machine by way of a power module connected to the exciter winding. According to the disclosure, in this motor vehicle, a counter-voltage can be generated by way of a de-excitation module, connected to the exciter winding and arranged separately from the power module and which can be operated separately from the power module, which is applied to the exciter winding and at can least partly compensate for the voltage currently being generated by way of the power module and applied to the exciter winding, so that the exciter winding can be de-excited, wherein the motor vehicle comprises a control device which is designed and configured to carry out the method according to the previous description. All the benefits and features explained in connection with the method according to the disclosure can be applied equally to the motor vehicle according to the disclosure and vice versa.

In the motor vehicle according to the disclosure it can be provided that the power module and the de-excitation module is electrically connected across at least one common electric slip contact or by respective separate electric slip contacts to the exciter winding, wherein the slip contact or the slip contacts each comprise at least one slip ring and at least one brush. In order to assure the shortest possible response time in regard to generating the counter-voltage, the brush provided for applying the counter-voltage preferably lies permanently against the corresponding slip ring.

Further benefits, features and details of the present disclosure will emerge from the following explained exemplary embodiments as well as the FIGURE.

BRIEF DESCRIPTION OF THE DRAWING

The FIGURE shows schematically a motor vehicle according to one exemplary embodiment of the present disclosure, with the aid of which an exemplary embodiment of the method according to the disclosure will be explained.

DETAILED DESCRIPTION

The motor vehicle 1 comprises an electric machine 2 configured as an externally excited synchronous machine, which is connected to the wheels 4 of the motor vehicle 1 across a drive train 2, indicated only very schematically. The drive train 3 comprises not otherwise shown shafts and differentials, by which a torque can be transmitted from the electric machine 2 to the wheels 4 and vice versa. In the present example, the motor vehicle 1 is configured as a front-wheel drive.

The electric machine 2 comprises a rotor 6 having multiple exciter windings 5 and a stator 8 having multiple stator windings 7. A current flow in the exciter windings 5 is controlled by way of a power module 9 connected to the exciter windings 5. The power module 9 here acts like a rectifier, by way of which a DC voltage present on the side with a traction battery 10 of the motor vehicle 1 can be converted into an alternating voltage and vice versa.

For the transmitting of the electric voltage to the exciter windings 5, there is provided a slip contact. This is realized in that slip rings 12 are arranged on a shaft 11 which is connected to the rotor 6 and are in contact with brushes 13.

Moreover, a de-excitation module 14 is provided, by way of which a counter-voltage can be generated, which is applied to the exciter windings 5 and at least partly compensates for the voltage presently being generated by way of the power module and applied to the exciter windings 5. The de-excitation module 14 comprises corresponding circuits with semiconductor elements for this purpose. The de-excitation module 14 is arranged separate from the power module 9 and can be operated separately from it. The counter-voltage is transmitted across brushes 15 lying against the slip rings 12 to the exciter windings 5. Alternatively to the brushes 15, it can be provided that the counter-voltage generated on the part of the de-excitation module, like the voltage generated on the part of the power module 9, is transmitted across the brushes 13 to the exciter windings 5, the corresponding cables being indicated in the FIGURE by dotted lines.

In the exemplary embodiment shown, it is provided that the counter-voltage is generated by way of a voltage present in a low-voltage onboard network 25, in which a low-voltage battery 16 of the motor vehicle 1 is incorporated. The low-voltage onboard network 25 in the present instance is a 12-Volt onboard network, in which not otherwise shown consumers of the motor vehicle 1 are incorporated.

Alternatively, the counter-voltage can be generated by a voltage present in a high-voltage onboard network 17, in which the traction battery 12 of the motor vehicle 1 is incorporated. The corresponding connection cable is indicated in the FIGURE by the dot and dash line. In order to set the magnitude of the counter-voltage generated by way of the de-excitation module 14, it has a voltage regulating element 18, which in the present example is a voltage transformer. The voltage regulating element 18 can also be a boost converter.

In the following, with the aid of the motor vehicle 1 shown in the FIGURE, an exemplary embodiment of the method according to the disclosure will be explained, where a control device 19 of the motor vehicle 1 is designed and provided in order to carry it out. In one or more implementations, the control device 19 includes a processor and a memory storing instructions that, when executed by the processor, causes the control device 19 to perform the acts described herein.

Thus, it is provided in the method that the counter-voltage is generated upon occurrence of a malfunction involving the control system and/or the operation of the electric machine 2 or the power module 9, and this is taken to the exciter windings 5 independently of the voltage supply provided by the power module 9. The counter-voltage brings about a de-excitation of the exciter windings 5, so that a magnetic field generated by way of the exciter windings 5 is reduced. In this way, currents induced through this magnetic field are prevented from getting into the stator windings 7, these currents being large enough to cause damage to the components connected to them.

It is important here that the power module 9 and the de-excitation module 14 are provided separately and self-sufficient from one another, so that in particular a disturbance present on the part of the power module 9 does not result in failure to generate the counter-voltage and thus de-excitation of the exciter windings 5. The voltage generated by way of the power module 9 and that by way of the de-excitation module 14 can be taken by separate conduction pathways 20 to the exciter windings 5 and the slip rings 12.

For the detecting of fault information regarding a faulty state in connection with the control and/or the operation of the electric machine 2 or the power module 9, the control device 19 is provided, functioning as a fault detection device. The control device 19 thus acts like a fault diagnostic device, which is adapted to activate the de-excitation module 14 upon detecting a fault and in the presence of the corresponding fault information, so that the counter-voltage can be generated.

The control device 19 is connected to the power module 9 or a control unit 21 of the power module 9, on which a software is implemented for operating the control of the power module 9. Thus, a first piece of fault information is oriented to the absence of a proper operation of the software of the control unit 21, requiring, for example, a restarting of this software.

A second piece of fault information is oriented to the loosening of a connection cable of the motor vehicle 1 or the electric machine 2. Signals or electric currents can be transmitted by the connection cable to and/or from the electric machine 2 or be transmitted within the electric machine 2.

But since the mere presence of the fault information does not necessarily require the generating of the counter-voltage, additional operating information regarding the operation of the electric machine 2 is detected when the fault information is present. Sensors 22 connected to the control device 19 are provided for detecting the operating information.

Thus a first piece of operating information concerns or describes the current speed of rotation of the rotor 6, and the detecting of this operating information is done by way of the sensor 22 designed as a rotor position transmitter 23. Through the rotor position transmitter 23, measurement data regarding the current rotation position of the rotor 6 are detected and transmitted to the control device 19.

A second piece of operating information concerns or describes a current temperature of the exciter windings 5, which is detected by a sensor 22 configured as a temperature sensor 24. Through the temperature sensor 24, measurement data regarding the current temperature of the rotor 6 or the exciter windings 5 are detected and transmitted to the control device 19.

Finally, a third piece of operating information describes an electric current strength currently present in the exciter windings 5 or an electric voltage currently applied to the exciter windings 5. This operating information is detected on the side with the control device 19 through control data of the control unit 21. Alternatively, a separate current or voltage sensor of the exciter windings 5 can be provided for this purpose.

The generating of the counter-voltage then occurs if induction information indicates that the current strength currently induced in the stator windings 7 is larger than a current strength limit value, for example, a given fixed value. The induction information is determined with the aid of the operating information. Thus, the current strength induced in the stator windings 7 will be larger as the current speed of rotation and the magnetic field currently being generated by the exciter windings 5 are larger and the current temperature of the exciter windings 5 is smaller. If the anticipated induced current strength is greater than the given current strength limit value, it is to be expected that damage will occur to the components connected to the stator windings 7. In this case, the de-exciter module 14 will be activated by way of the control device 19 so that the counter-voltage is generated. if the anticipated induced current strength is smaller than the given current strength limit value, it is to be expected that no damage will occur to the components connected to the stator windings 7 on account of the induced current strength. In this case, no activation of the de-exciter module 14 will occur.

The amplitude of the generated counter-voltage likewise depends on the operating information. Thus, the generated counter-voltage is such that the voltage currently being generated on the part of the power module 9 and applied to the exciter windings 5 is completely compensated, but at least reduced to such an extent that the anticipated current strength induced in the stator windings 7 is less than or equal to the current strength limit value.

German patent application no. 102022117402.6, filed Jul. 13, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for control of an externally excited electric machine of a motor vehicle, the method comprising:
   generating a current flow in at least one exciter winding of the electric machine by way of a power module connected to the at least one exciter winding,
   generating a counter-voltage by way of a de-excitation module, connected to the at least one exciter winding and arranged separately from the power module and operated separately from the power module;
   providing the counter-voltage to the at least one exciter winding,
   wherein the counter-voltage at least partly compensates for a voltage currently being generated by way of the power module and provided to the at least one exciter winding, and
   wherein the counter-voltage provided to the at least one exciter winding causes a de-excitation of the at least one exciter winding.

2. The method according to claim 1, further comprising:
   registering at least one item of fault information by way of at least one fault detection device,
   wherein the fault information describes a malfunction in regard to control or operation of the electric machine, and
   wherein the generating of the counter-voltage only occurs if the fault information is registered.

3. The method according to claim 2,
   wherein the at least one fault detection device is connected to the power module.

4. The method according to claim 2,
wherein the fault information describes an irregular operation of software that controls the electric machine or the power module, or loosening of a connection cable of the motor vehicle or the electric machine, by which signals or electric currents are transmitted to or from the electric machine or within the electric machine.

5. The method according to claim 4,
wherein the software is executed by a control unit.

6. The method according to claim 2, further comprising:
registering at least one item of operating information regarding operation of the electric machine by way of at least one sensor of the motor vehicle or the electric machine,
wherein the generating of the counter-voltage is based on the at least one item of operating information.

7. The method according to claim 6,
wherein the at least one item of operating information describes:
   a current speed of rotation of a rotor of the electric machine, or
   an electric current strength currently present in the at least one exciter winding, or
   an electric voltage currently provided to the at least one exciter winding, or a current temperature of the at least one exciter winding.

8. The method according to claim 7,
wherein the generating of the counter-voltage is done when induction information ascertained using the at least one item of operating information and regarding a current strength currently induced in a stator winding indicates that the current strength currently induced in the stator winding that is brought about by a current rotor speed and a magnetic field generated by the at least one exciter winding is larger than a current strength limit value.

9. The method according to claim 1, wherein:
the counter-voltage is generated by way of a voltage present in a first onboard network that includes a first battery of the motor vehicle, or by way of a voltage present in a second onboard network that includes a second battery of the motor vehicle, and
a voltage of the first battery included in the first onboard network is greater than a voltage of the second battery included in the second onboard network.

10. The method according to claim 9, wherein:
a voltage regulating element is connected between the first onboard network or the second onboard network and the electric machine, and
an amplitude of the counter-voltage is set by way of the voltage regulating element.

11. The method according to claim 10,
wherein the voltage regulating element is a voltage transformer or a boost converter.

12. The method according to claim 1,
wherein a currently-generated voltage generated by the power module and provided to the at least one exciter winding is partly or completely compensated by way of the counter-voltage.

13. A motor vehicle comprising:
an externally excited electric machine;
a power circuit connected to at least one exciter winding of the electric machine, wherein the power circuit, in operation, generates or controls a current flow in the at least one exciter winding of the electric machine; and
a de-excitation circuit connected to the at least one exciter winding, wherein the de-excitation circuit is arranged separately from the power circuit and is operable separately from the power circuit, wherein the de-excitation circuit, in operation, generates a counter-voltage that is provided to the at least one exciter winding, wherein the counter-voltage at least partly compensates for a currently-generated voltage generated by the power circuit and provided to the at least one exciter winding, and wherein the counter-voltage causes a de-excitation of the at least one exciter winding.

14. The motor vehicle according to claim 13,
wherein the power circuit and the de-excitation circuit are electrically connected across at least one common electric slip contact or by respective separate electric slip contacts to the at least one exciter winding, and
wherein the slip contact or the slip contacts each comprise at least one slip ring and at least one brush.

* * * * *